Nov. 7, 1961  J. R. HENKEL  3,007,320
AUTOMATIC REGULATORY CONTROL SYSTEM
Filed Jan. 16, 1961
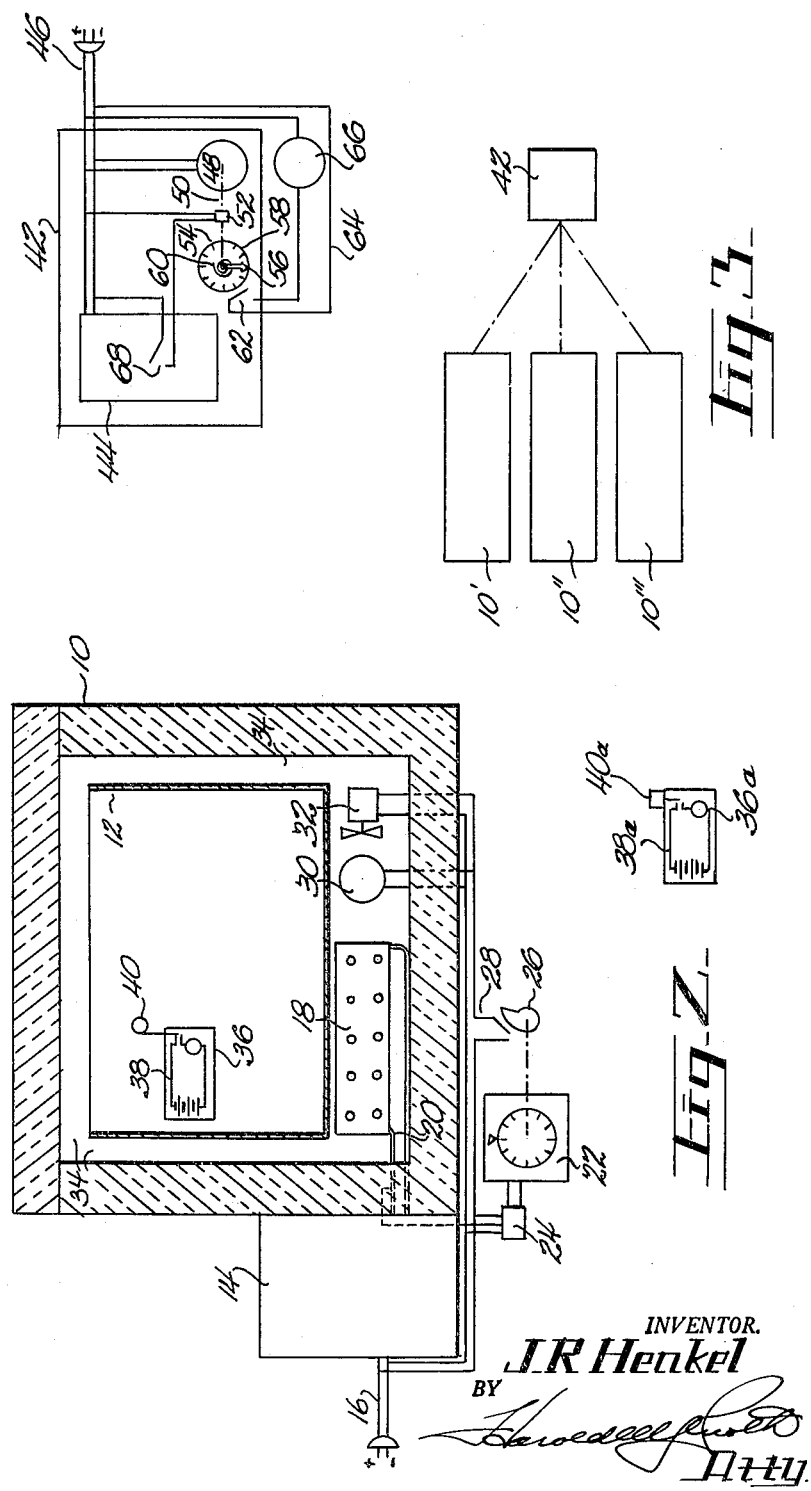
INVENTOR.
J. R. Henkel
BY 
United States Patent Office 3,007,320  
Patented Nov. 7, 1961

3,007,320  
AUTOMATIC REGULATORY CONTROL SYSTEM  
John R. Henkel, Rock Island, Ill.  
(1717 E. 31st St., Davenport, Iowa)  
Filed Jan. 16, 1961, Ser. No. 83,099  
6 Claims. (Cl. 62—126)

This invention relates to an automatic regulatory control system and more particularly to a system for detecting malfunctioning and the like in various types of apparatus, situations and instrumentalities.

A preferred example or field in which the invention finds practical utility is that in which it is exploited as a corrective or warning system in conjunction with the operation of storage and other equipment; although, the invention may be just as suitably exploited in other situations. As one example, the typical super market provides a representative background, because it employs so many types of containers and other equipment for the maintenance of food and other perishables at pre-selected temperature and/or humidity conditions. If the malfunctioning or failure of such equipment goes undetected for any length of time, considerable damage by way of spoilage can occur. Although safety and warning devices have heretofore been employed, these are subject to the disadvantage that they also transmit false or unnecessary alarms and therefore are highly inefficient. Moreover, they are, in the main, relatively expensive and cost plus other disadvantages normally preclude universal use thereof.

A typical example is represented by a frozen food case or walk-in cooler wherein desired temperature and humidity conditions must be maintained. Because most equipment of this type is equipped with automatic defrost systems, the temperature and/or humidity conditions may be departed from for a tolerable length of time. An ordinary alarm system detecting this departure from the predetermined norm would obviously signal malfunctioning during the defrost period, whereas this is undesirable, because if the defrost system is working properly, it will complete its cycle in normal fashion and restore the refrigeration or cooling equipment to its proper cycle to again bring about the desired temperature and/or humidity norm.

According to the present invention, this disadvantage is eliminated by the provision of a system and method of its operation whereby false signals are eliminated by means incorporating a time-delay mechanism embodied in a means for receiving a signal and for automatically determining whether the signal should be ignored or ultimately transformed into a responsive means whereby corrective measures may be taken. In other words, the present system operates to create a response only when absolutely necessary. It is a further important and significant object of the present invention to provide a system which employs relatively inexpensive and known components arranged in a novel combination. It is a further object of the invention to employ the transmission of a signal by means of the transmission of radio waves or their equivalent, whereby to enable the location of the signal receiver means relatively remotely from the apparatus in which the detector-transmitter is located. Further objects of the invention aim toward the use of a central receiving station capable of receiving signals from a plurality of different pieces of equipment or apparatus; means for detecting malfunctioning in the departure of the apparatus or equipment from norms such as temperature, humidity, etc.; and such other important objects and desirable features, inherent in and encompassed by the invention, as will become apparent from the following disclosure of preferred embodiments of the invention, all as described in the ensuing specification and as illustrated in the accompanying sheet of drawings, the figures of which are described below.

FIGURE 1 is a schematic illustration of a typical installation.

FIGURE 2 is a schematic illustration of a different type of transmitter-detector.

FIGURE 3 is a schematic illustration of a plurality of pieces of apparatus or equipment signalling to a central station.

As already indicated, the present disclosure is illustrative and not limiting, since, on the basis of this disclosure, the exploitation of the invention in other situations and for other types of apparatus and equipment will readily occur to those versed in the art.

With the above in mind, the present disclosure is based on the utilization of apparatus represented here by an insulated case 10, having interiorly thereof a container 12 which may be regarded as a low-temperature or controlled-temperature compartment for the storage of food or other perishables, or other material that must exist according to a predetermined norm or pattern. Along the same lines as the controlled-temperature compartment illustrated, similar compartments will occur in walk-in coolers and the like.

Refrigeration of the container or compartment 12 to maintain the proper temperature and/or humidity conditions is accomplished by a refrigeration unit designated in its entirety by the numeral 14, which may consist of the well-known motor-compressor-condensor unit, connected to line voltage as at 16. In the present instance, the evaporator, shown at 18, for the refrigeration system, is of the tube and fin type, connected to the unit 14 by typical refrigeration lines 20. Here, as elsewhere in the disclosure, the components are representative of conventional and well-known components and therefore are illustrated and described only briefly and relatively schematically. The present refrigeration system is of the type including automatic defrost means which, by means of a timer 22, may be pre-selected to defrost the system at certain intervals, say, once every twenty-four hours. Here again, these are only details that can be varied at will. The present defrost timer is shown as being associated with the refrigeration system via a time-pressure switch 24 connected to one of the refrigerant lines and also electrically connected to the source of electrical potential 16. The timer actuates a cam 26, for example, which functions at the proper time to close a normally open electrical switch 28 which energizes that part of the positive defrost system represented by a heater 30 and a fan 32, which components, when enrgized, will automatically defrost the evaporator 18. Obviously, during the defrost cycle, the temperature in the compartment 12 will rise, because the relatively warmer air may circulate through the spaces designated generally at 34. When, however, the system is performing properly, the temperature in the compartment 12 will be maintained at the pre-selected norm which, of course, will include slight variation between upper and lower limits, the upper of which will, of course, be exceeded during the defrost cycle.

Because of the relatively critical situation involving the maintenance of the pre-selected norm, proper functioning of the refrigeration system, or its equivalent, is necessary to the proper protection or storage of the perishables or other material, and variations on the conditions just outlined, as occurring in situations and equipment of other types, will readily occur to those versed in the art. Thus, broadly speaking, the disclosure so far represents, by way of example only, a situation in which a pre-selected condition or status must be caused to exist at a predetermined norm, subject at times to departure from that norm and further subject to return to that norm. In the present case, for example, the temperature in the compartment 12 will be maintained at the proper norm as long as the refrigeration system is functioning properly. When the defrost cycle is incurred, there will be a departure from that norm. However, this departure will be only temporary, again assuming proper functioning of the defrost cycle, since when the defrost cycle terminates, the refrigeration system will again function to restore the norm and to maintain the norm until the next defrost cycle occurs. Therefore, it is not enough to detect differences in temperature—or departures from the norm—which will exist for only a brief period. What is a brief period is determined by the length of time that departure from the norm can be tolerated. This of course will vary according to the situation encountered, and will vary even in refrigeration systems according to the nature of the perishable being refrigerated or cooled. By the same token, the same is true in other situations in which it is desired to maintain something at a predetermined high temperature, humidity, degree of dryness, etc.

Again, and resorting to the present disclosure by way of example, the norm to be maintained is the temperature in the compartment 12, and for this purpose the detector and signalling means is represented schematically by a transmitter 36 having an electrical circuit 38 responsive to changes in temperature in the compartment 12 via a thermo-sensitive device or thermostat 40. Since it is desired to make this equipment as inexpensive as possible, it is preferred that the detector-transmitter is of the battery-powered type and therefore the circuit 38 is shown as including a battery, illustrated symbolically and therefore needing no description. As shown in FIGURE 2, a transmitter 36a is illustrated as having a similar circuit which is responsive to a means for detecting changes in humidity, such as a typical humidistat 40a, the circuit being shown at 38a. The transmitter is capable, in any conventional fashion which therefore requires no further description, of transmitting a signal in the form of radio waves, in the present case in the direction toward the right of the sheet and therefore toward a receiving station designated in its entirety by the numeral 42. In FIG. 3, such station 42 is shown as associated with a plurality of pieces of equipment 10′, 10″ and 10′′′, each of which may be like that shown at 10; although, each of these may be different. That is to say, one may be a walk-in cooler, another may be a frozen food case, and the other may be a refrigerated open food storage case. These are only typical of the many variations to which the present invention is subject. The receiving station or receiving means 42 may include therewithin a radio wave receiver 44, connected to line voltage as at 46 to which is further electrically connected a timer motor 48 having its shaft 50 directed by a suitable clutch 52 to a time-delay device 54 which includes a shaft-driven pointer 56 selectively settable in any predetermined position on a dial 58 and biased by a spring 60 to return to what may be regarded as an idle or quiescent start position, from which it is adapted to run, when driven by the motor 48, to an end position in which it closes a switch 62 in part of the electrical circuit 64 which is connected with a responder means 66. This responder means may be, simply, an alarm, but the invention contemplates that it may also utilize a connection to other suitable means such as a telephone at the central station or even some means for correcting the malfunctioning that will be signalled by the transmitter 36, received by the receiver 42 and ultimately delivered to the responder 66. In conventional fashion, the receiver 44 includes a normally open switch 68 which, when closed, in response to the signal from the transmitter 36, will connect the clutch 52 so that the constantly running motor 48 will, via the shaft 50, drive the pointer 56 through its "run" phase.

In operation, when the refrigeration system (or any equivalent system) is functioning properly, there will be no radio signal transmitted by the transmitter 36 to the receiver 34. Hence, the switch 68 will be open. The absence of a signal may be regarded as a first signal condition between the transmitter 36 and the receiver 44. The continued existence of the first signal condition will depend, of course, on proper functioning of the system so that the norm being detected (in this case temperature in the compartment 12) represents a predetermined desirable situation. In the event of malfunctioning of the refrigeration system (for example), the thermostat 40 will detect departure of the temperature from the preselected norm and this in turn will actuate the transmitter 36 which in turn will transmit the radio signal to the receiver 44, thereby closing the switch 68 in the clutch circuit to close the clutch 52 so that the motor 48 drives the pointer 56, in this case, for example, in a clockwise direction. In a typical situation, the pointer 56 will be pre-set at an angular position representing an amount of time or time interval corresponding to the "run" phase of the time-delay device, through which the pointer may travel before it closes the circuit at 62. For example, let it be assumed that the defrost cycle in the presently illustrated refrigeration system is seventy-five minutes in duration. This is determined as part of the basic design of the refrigeration system; that is to say, the system can tolerate a departure from the temperature norm for the assumed period of seventy-five minutes. Actually, the toleration may be somewhat greater than that and accordingly the pointer 56 may be pre-set at a position on the dial 54, say, ninety minutes ahead of the point at which it will close the switch 62. Accordingly, when the defrost cycle normally begins, that is, according to its normal and expected function in the refrigeration system, the rise in temperature in the compartment 12 incident to the initiation of the defrost period will of course be detected by the thermostat 40 which in turn will actuate the transmitter 36 which will transmit a signal to the receiver 44, thus setting up what may be regarded as the second signal condition. The switch 68 will be closed by the transmitter 44, thereby connecting the clutch 52 so that the constantly running motor 48 will drive the pointer 56 away from its position in which it has been pre-set at, in the example chosen, at ninety minutes ahead of the point at which the switch 62 will be closed. Then, assuming the seventy-five-minute defrost period already selected for this example, it will be expected that the defrost cycle will have terminated in seventy-five minutes, which means that the pointer 56 still has fifteen minutes to go before it will close the switch 62. If the refrigeration system is working properly, the departure from the temperature norm, incurred during the defrost cycle, will be only temporary and that norm will soon be restored. All during the defrost cycle, as an incident to the temporary departure of the temperature from the preselected norm, the radio signal is transmitted from 36 to 44 and the circuit to the clutch 52 will be closed so that the pointer 56 is running toward its end position. However, when the defrost cycle ends (at the assumed expiration of seventy-five minutes) the radio signal will be interrupted and the switch 68, normally biased open, will again open and will disconnect the clutch 52 so that the pointer 56 is no longer driven by the motor shaft 50. The pointer spring 60 will thereby restore the pointer 56 to its originally set position and the switch 62, will not, in that occurrence of events, be actuated. Hence, the responder 66 will not be energized or actuated. However, let it be assumed that the refrigeration system goes automatically into its defrost cycle but at some point therein a malfunction occurs in which the defrost cycle does not terminate at the preselected period. Therefore, the departure from the temperature norm will not be as temporary as previously outlined but will be more of a permanent nature, and therefore the radio signal from the transmitter 36 to the receiver 44 will continue, keeping the switch 68 closed and keeping the clutch 52 engaged so that the motor 48 continues to drive the pointer 56 beyond the seventy-five-minute period in which it would be expected that the defrost period would terminate. Hence, as the pointer 56 travels beyond the seventy-five-minute period, it will ultimately pass into the ninety-minute period for which the pointer 56 was previously set, thereby closing the switch 62 and energizing the responder 66 which, as previously stated, may be any form of warning device, such as a light, an alarm or even a conventional connection to a telephone or the like, thus giving the apprisal that the system has malfunctioned and that it therefore needs attention. A detecting and warning system of this nature is particularly valuable when it evidences responses of the character just noted during off hours when the supermarket or the like is closed and no personnel are on hand to render immediate attention.

The same relationship and operational characteristics may be derived from a system equipped with the humidistat-transmitter shown in FIGURE 2, for this will detect changes in humidity and, as well known to those versed in the art, changes in humidity occur with changes in temperature. In some cases, the humidity factor is of different significance than the temperature factor but, on the basis of the present disclosure, either or both factors may be used, as may any others that are functions of some pre-selected norm. Hence, reference herein to the refrigeration system as a means for maintaining a relatively low temperature are illustrative only, since there may be situations in which relatively high temperatures will be maintained by apparatus other than refrigeration apparatus, and there may be still other situations in which the maintenance of the normal ambient norm is incident to proper function and departure from such norm will be detected. The invention is primarily adapted, as already outlined, to equipment, apparatus, situations etc. in which the norm may be departed from for a tolerable period and then restored. Even in a refrigeration system, other functions of normal and abnormal operation may be detected, such as head pressure in the compressor, the flow of circulating air and the like. Other variations in situations and in the application of the invention thereto, as well as variations in the specific embodiments illustrated, will readily occur to those versed in the art, all without departure from the spirit and scope of the invention.

What is claimed is:

1. In combination with apparatus adapted to perform according to a certain norm and subject at times to influences causing departure from said norm and further subject thereafter to influences causing restoration thereof to said norm: responder means changeable between a first status and a second status respectively according to performance of said apparatus according to said norm and departure thereof from said norm; detector and signal means operatively associated with and responsive to the performance of said apparatus to incur first and second signal conditions respectively according to existence of and departure from said norm; receiver means operatively influenced by said signal conditions; and actuating means connected with the receiver means and the responder means for incurring the first status and second status of the responder means respectively according to the influence on said receiver means of said first and second signal conditions, said actuating means including a time-delay device initially settable in a start position incurring the first status of the responder means and energizable by the receiver means when influenced by the second signal condition to run through a predetermined interval to an actuating position for changing the responder means to its second status, said time-delay device being operative to return to its start position at any point within said interval when the second signal conditions are superseded by the first signal conditions in response to return of the apparatus to said norm.

2. The invention defined in claim 1, in which: the time-delay device is adjustable to vary the start position relative to the actuating position thereof so as to enable selective variation of the interval.

3. The invention defined in claim 1, in which: the detector and signal means includes a radio wave transmitter quiescent during performance of said apparatus at said norm to establish the first signal condition and operative to transmit radio waves pursuant to departure of said apparatus from said norm to establish said second signal condition, and said receiver means includes a radio receiver tuned to said transmitter.

4. The invention defined in claim 1, in which: said apparatus includes refrigeration means for establishing a certain temperature condition as said norm, and automatic defrost means for effecting departure from said temperature condition and expected automatic return to said temperature condition normally within an interval less than that of the time-delay device.

5. The invention defined in claim 1, in which: said apparatus includes temperature-control means for establishing a certain temperature as said norm and automatic means settable to effect a temporary departure from and expected subsequent return to said norm in an interval less than that of the time-delay.

6. The invention defined in claim 1, in which: said apparatus includes means for establishing a certain humidity condition as said norm and automatic means settable to effect a temporary departure from and expected subsequent return to said norm in an interval less than that of the time-delay.

References Cited in the file of this patent

UNITED STATES PATENTS

| | | |
|---|---|---|
| 2,029,542 | Polin | Feb. 4, 1936 |
| 2,253,657 | Smith | Aug. 26, 1941 |
| 2,357,609 | Ray | Sept. 5, 1944 |
| 2,439,331 | Bean | Apr. 6, 1948 |
| 2,764,355 | Machlet | Sept. 25, 1956 |
| 2,893,217 | Nigro | July 7, 1959 |
| 2,989,621 | Barton | June 20, 1961 |